US011418525B2

(12) United States Patent
Wu

(10) Patent No.: US 11,418,525 B2
(45) Date of Patent: Aug. 16, 2022

(54) DATA PROCESSING METHOD, DEVICE AND STORAGE MEDIUM

(71) Applicant: Alibaba Group Holding Limited, Grand Cayman (KY)

(72) Inventor: Fan Wu, Zhejiang (CN)

(73) Assignee: Alibaba Group Holding Limited, George Town (KY)

( * ) Notice: Subject to any disclaimer, the term of this patent is extended or adjusted under 35 U.S.C. 154(b) by 347 days.

(21) Appl. No.: 16/578,034

(22) Filed: Sep. 20, 2019

(65) Prior Publication Data
US 2020/0099710 A1   Mar. 26, 2020

(30) Foreign Application Priority Data

Sep. 21, 2018   (CN) .......................... 201811108788.2

(51) Int. Cl.
*H04L 29/06*     (2006.01)
*H04L 9/40*      (2022.01)
*G06N 20/00*     (2019.01)

(52) U.S. Cl.
CPC ......... *H04L 63/1425* (2013.01); *G06N 20/00* (2019.01); *H04L 63/10* (2013.01); *H04L 63/145* (2013.01)

(58) Field of Classification Search
CPC ... H04L 63/1425; H04L 63/10; H04L 63/145; H04L 63/1416; G06N 20/00
USPC ......................................................... 726/23
See application file for complete search history.

(56) References Cited

U.S. PATENT DOCUMENTS

| 9,628,362 | B2 | 4/2017 | Vasseur et al. |
| 9,979,606 | B2 | 5/2018 | Gupta et al. |
| 10,419,468 | B2 | 9/2019 | Glatfelter et al. |
| 10,949,821 | B1* | 3/2021 | Yaqub .................... G06Q 20/02 |
| 2015/0180829 | A1* | 6/2015 | Yu ....................... H04L 63/0853 726/11 |
| 2016/0021122 | A1 | 1/2016 | Pevny |
| 2016/0105462 | A1 | 4/2016 | Duffield et al. |
| 2017/0318043 | A1 | 11/2017 | Shin et al. |
| 2018/0027006 | A1 | 1/2018 | Zimmermann et al. |
| 2018/0084012 | A1 | 3/2018 | Joseph et al. |

(Continued)

FOREIGN PATENT DOCUMENTS

| CN | 102567661 A | 7/2012 |
| CN | 105208037 A | 12/2015 |

(Continued)

OTHER PUBLICATIONS

CN-107360118-A English translation.*

(Continued)

*Primary Examiner* — Tu T Nguyen
(74) *Attorney, Agent, or Firm* — Lee & Hayes, P.C.

(57) ABSTRACT

A type identification is firstly performed on a to-be-processed access request, and when the to-be-processed access request is identified as a first-type access request, anomaly identification is then performed on the to-be-processed access request by using a machine learning model. The techniques of the present disclosure not only accurately identify an abnormal access request, but also effectively reduce the number of access requests that need to be identified by the machine learning model, thus saving computing resources of the device and improving the operating performance of the device.

20 Claims, 7 Drawing Sheets

(56) References Cited

U.S. PATENT DOCUMENTS

| | | | |
|---|---|---|---|
| 2018/0164770 A1 | 6/2018 | Kawanoue et al. |
| 2018/0275631 A1 | 9/2018 | Kitamura et al. |
| 2018/0285771 A1 | 10/2018 | Lee et al. |
| 2019/0227528 A1 | 7/2019 | Abbott et al. |
| 2019/0260795 A1 | 8/2019 | Araiza et al. |
| 2019/0280942 A1 | 9/2019 | Cote et al. |

FOREIGN PATENT DOCUMENTS

| | | | |
|---|---|---|---|
| CN | 106656932 A | | 5/2017 |
| CN | 106713371 A | | 5/2017 |
| CN | 106998317 B | | 8/2017 |
| CN | 107360118 A | * | 11/2017 |
| CN | 107483451 A | | 12/2017 |
| CN | 107612948 A | | 1/2018 |
| CN | 107888571 A | | 4/2018 |
| CN | 108345795 A | | 7/2018 |
| JP | WO2017104112 A1 | | 6/2017 |
| JP | 2018097839 A | | 6/2018 |
| JP | WO2018110259 A1 | | 6/2018 |

OTHER PUBLICATIONS

Machine Translation Chinese Office Action dated Sep. 3, 2021 for Chinese patent application No. 201811108788.2, a counterpart foreign application of U.S. Appl. No. 16/578,034, 10 pages.
The Chinese Search Report dated Aug. 30, 2021 for CN Patent Application No. 201811108788.2, 2 pages.

* cited by examiner

200

ACQUIRE TO-BE-PROCESSED ACCESS REQUEST
202

GENERATE COMMUNICATION TRAFFIC FEATURE AND CONTENT STRUCTURE FEATURE OF TO-BE-PROCESSED ACCESS REQUEST ACCORDING TO INFORMATION CARRIED IN TO-BE-PROCESSED ACCESS REQUEST
204

PERFORM TYPE IDENTIFICATION ON TO-BE-PROCESSED ACCESS REQUEST ACCORDING TO COMMUNICATION TRAFFIC FEATURE AND CONTENT STRUCTURE FEATURE
206

PERFORM ANOMALY IDENTIFICATION ON TO-BE-PROCESSED ACCESS REQUEST BY USING MACHINE LEARNING MODEL WHEN TO-BE-PROCESSED ACCESS REQUEST IS IDENTIFIED AS FIRST-TYPE ACCESS REQUEST
208

FIG. 2

```
┌─────────────────────────────────────────────────────────────┐
│ MATCH BASELINE FEATURE AND SIGNATURE OF TO-BE-PROCESSED ACCESS │
│   REQUEST WITH NORMAL TRAFFIC BASELINE LIBRARY AND ABNORMAL   │
│          TRAFFIC SIGNATURE LIBRARY RESPECTIVELY               │
│                            302                                │
└─────────────────────────────────────────────────────────────┘
                              │
                              ▼
┌─────────────────────────────────────────────────────────────┐
│  WHEN BASELINE FEATURE OF TO-BE-PROCESSED ACCESS REQUEST DOES │
│    NOT MATCH NORMAL TRAFFIC BASELINE AND SIGNATURE OF TO-BE-  │
│  PROCESSED ACCESS REQUEST MATCHES ABNORMAL TRAFFIC SIGNATURE, │
│     DETERMINE THAT TO-BE-PROCESSED ACCESS REQUEST IS FIRST-TYPE│
│                      ACCESS REQUEST                           │
│                            304                                │
└─────────────────────────────────────────────────────────────┘
```

FIG. 3

```
┌─────────────────────────────────────────────────────────┐
│  MATCH BASELINE FEATURE OF TO-BE-PROCESSED ACCESS REQUEST WITH │
│              NORMAL TRAFFIC BASELINE LIBRARY            │
│                          402                            │
└─────────────────────────────────────────────────────────┘
                            │
                            ▼
┌─────────────────────────────────────────────────────────┐
│ WHEN BASELINE FEATURE OF TO-BE-PROCESSED ACCESS REQUEST DOES │
│ NOT MATCH NORMAL TRAFFIC BASELINE, MATCH SIGNATURE OF TO-BE- │
│   PROCESSED ACCESS REQUEST WITH ABNORMAL TRAFFIC SIGNATURE   │
│                        LIBRARY                          │
│                          404                            │
└─────────────────────────────────────────────────────────┘
                            │
                            ▼
┌─────────────────────────────────────────────────────────┐
│ WHEN SIGNATURE OF TO-BE-PROCESSED ACCESS REQUEST MATCHES │
│ ABNORMAL TRAFFIC SIGNATURE, DETERMINE THAT TO-BE-PROCESSED │
│     ACCESS REQUEST IS FIRST-TYPE ACCESS REQUEST         │
│                          406                            │
└─────────────────────────────────────────────────────────┘
```

FIG. 4

DATA PROCESSING METHOD, DEVICE AND STORAGE MEDIUM

CROSS REFERENCE TO RELATED APPLICATIONS

This application claims priority to Chinese Patent Application No. 201811108788.2, filed on 21 Sep. 2018 and entitled "DATA PROCESSING METHOD, DEVICE AND STORAGE MEDIUM," which is incorporated herein by reference in its entirety.

TECHNICAL FIELD

The present disclosure relates to the field of Internet technologies, and, more particularly, to data processing methods, devices and storage media.

BACKGROUND

With the development of the Internet, users may acquire a lot of information such as commodity information, service information, and purchase information from websites or servers over the network. In practical applications, illegal users often carry out illegal attacks on the websites or servers, such as sending a large number of requests to disrupt the websites or servers, or illegally controlling the websites or servers by implanting scripts or Trojan programs.

In order to ensure the security of websites or servers, it is necessary to identify the access requests to the websites or servers, thus identifying illegal access requests and blocking them, and ensuring the security of the websites or servers. However, for the networks or servers with massive daily traffic, identification of illegal requests consumes a lot of computing resources.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

Data processing methods, servers and storage media are provided to accurately identify abnormal access requests while saving computing resources.

A data processing method is provided in the example embodiments of the present disclosure, including: acquiring a to-be-processed access request; generating a communication traffic feature and a content structure feature of the to-be-processed access request according to information carried in the to-be-processed access request; performing type identification on the to-be-processed access request according to the communication traffic feature and the content structure feature; and performing anomaly identification on the to-be-processed access request by using a machine learning model when the to-be-processed access request is identified as a first-type access request. For example, the first-type access request is a suspicious request such that the signature of the to-be-processed access request matches an abnormal traffic signature.

A data processing device is further provided in the example embodiments of the present disclosure, including one or more memories and processors, wherein the memories are configured to store computer-readable instructions or computer program; and the processors are configured to execute the computer-readable instructions or computer program to: acquire a to-be-processed access request; generate a communication traffic feature and a content structure feature of the to-be-processed access request according to information carried in the to-be-processed access request; perform type identification on the to-be-processed access request according to the communication traffic feature and the content structure feature; and perform anomaly identification on the to-be-processed access request by using a machine learning model when the to-be-processed access request is identified as a first-type access request.

A computer readable storage medium storing computer-readable instructions or computer program is further provided in the example embodiments of the present disclosure, wherein when executed by one or more processors, the computer program causes the one or more processors to perform the steps in the data processing method.

In the example embodiments of the present disclosure, type identification is performed on a to-be-processed access request, and when the to-be-processed request is identified as a first-type access request, anomaly identification is then performed on the to-be-processed request by using a machine learning model. The techniques of the present disclosure not only accurately identify abnormal access request but also effectively reduce the number of access requests that need to be identified by the machine learning model, thus saving computing resources of the device and improving the operating performance of the device.

BRIEF DESCRIPTION OF THE DRAWINGS

The accompanying drawings described here are used to provide further understanding of the present disclosure, and constitute a part of the present disclosure. Schematic example embodiments of the present disclosure and descriptions thereof are used to explain the present disclosure and do not constitute improper limitation on the present disclosure. In the drawings.

FIG. 2 is a schematic flowchart of a data processing method according to another exemplary example embodiment of the present disclosure;

FIG. 3 is a schematic flowchart of determining a to-be-processed access request as a first-type access request according to another exemplary example embodiment of the present disclosure;

FIG. 4 is another schematic flowchart of determining a to-be-processed access request as a first-type access request according to yet another exemplary example embodiment of the present disclosure;

DETAILED DESCRIPTION

In order to make the objectives, technical solutions and advantages of the present disclosure clear, the technical solutions of the present disclosure will be clearly and completely described in the following with reference to specific example embodiments of the present disclosure and corresponding accompanying drawings. Apparently, the example embodiments described are merely a part of, rather than all the example embodiments of the present disclosure. Based on the example embodiments in the present disclosure, all other example embodiments obtained by those of ordinary skill in the art without creative efforts all belong to the protection scope of the present disclosure.

Webshell communication is communication traffic formed by hackers sending instructions to a controlled website. In the process of discovering webshell communication in HTTP access requests on a cloud server, the number of the HTTP access requests is huge due to the huge scale of the cloud server and numerous websites on the cloud server. For the cloud server, the total number of access requests in a short period of time may reach more than 1 billion, which will consume a lot of computing resources if data processing is performed on all the access requests.

In order to solve the above technical problem, in example embodiments of the present disclosure, type identification is first performed on a to-be-processed access request, and when the to-be-processed access request is identified as a first-type access request, anomaly identification is then performed on the to-be-processed access request by using a machine learning model. As such, not only may an abnormal access request be accurately identified, but also the number of access requests that need to be identified by the machine learning model may be effectively reduced, thus saving computing resources of the device and improving the operating performance of the device.

The technical solutions provided in various example embodiments of the present disclosure are described in detail in the following with reference to the accompanying drawings.

Figure 1:
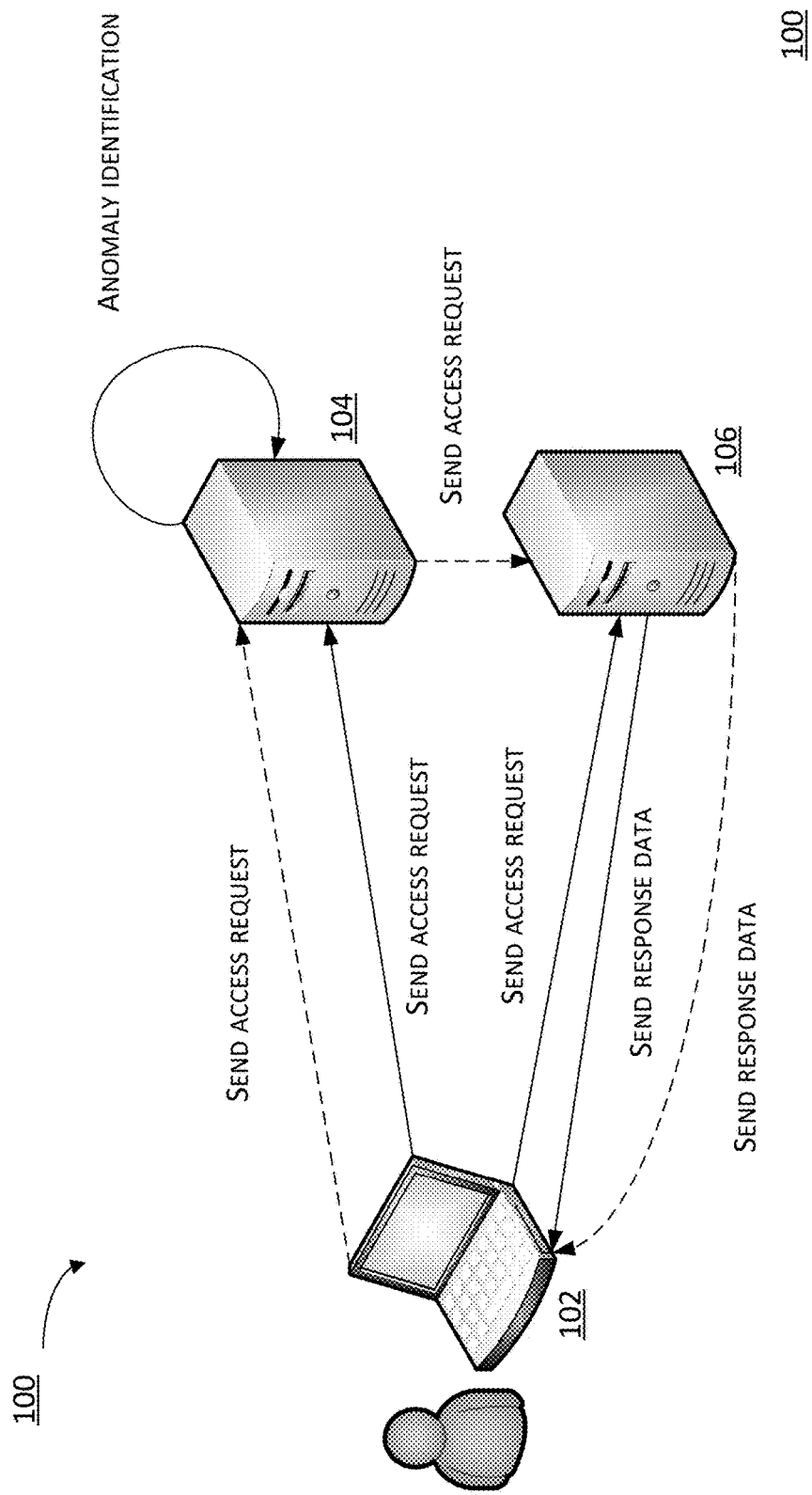
FIG. 1 is a schematic structural diagram of an exemplary data processing system according to the present disclosure.

FIG. 1 is a schematic structural diagram of a data processing system according to an example embodiment of the present disclosure. As shown in FIG. 1, a processing system 100 includes: a terminal 102, a data processing device 104, and a data responding device 106.

The terminal 102 is a terminal device used by a user, which may be any device with a certain computing capability, for example, a smart phone, a tablet computer, a personal computer, and so on. The basic structure of the terminal 102 includes: at least one processing unit and at least one memory. The number of the processing units and the number of the memories depend on the configuration and type of the terminal 102. The memory may include a volatile memory such as a random-access memory (RAM), or a non-volatile memory such as a Read-Only Memory (ROM) or a flash memory, or include both of a volatile memory and a non-volatile memory. An Operating System (OS), one or more applications, as well as program data are generally stored in the memory. In addition to the processing unit and the memory, the terminal 102 further includes some basic configurations, for example, a network card chip, an IO bus, audio and video components, and so on. For example, the terminal 102 may further include some peripherals, for example, a keyboard, a mouse, a stylus, and so on. Other peripherals are well known in this field and will not be described in detail here.

In this example embodiment, the terminal 102 may send an access request to the data responding device 106 in response to an operation of a user. The access request may be an HTTP request for viewing a document, an HTTP request for modifying content, an HTTP request for saving a video, and so on. The terminal 102 may interact with the data responding device 106 through an installed program. The program may be a video access PC client terminal, a cloud data access APP, and so on.

The data responding device 106 refers to a server capable of providing information or data interaction services in a network environment. In terms of physical implementation, the data responding device 106 may be any device capable of providing a computing service, responding to service requests, and performing processing, for example, a regular server, a cloud server, a cloud host, a virtual center, and so on. For example, the data responding device 106 is a cloud server. The server is mainly composed of a processor, a hard disk, a memory, a system bus, and so on, which is similar to the architecture of a general-purpose computer.

The user sends an access request to the data responding device 106 through his/her terminal 102, and may also acquire corresponding response data from the data responding device 106 over the network. The response data here may be a file viewed, a video requested to be played back, modified content, and so on.

The data processing device 104 refers to a server capable of providing an anomaly identification service to an access request for the data responding device 106 over the network environment. In terms of physical implementation, the data processing device 104 may be any device capable of providing a computing service and processing a service request, such as a regular server, a cloud server, a cloud host, a virtual center, and so on. For example, the data processing device 104 is a cloud server. The server is mainly composed of a processor, a hard disk, a memory, a system bus, and so on, which is similar to the architecture of a general-purpose computer.

In the process that the user sends an access request to the data responding device 106 through his/her terminal 102 to request access to the data responding device 106, the data processing device 104 may perform anomaly identification on the access request and provide an anomaly identification result to the data responding device 106. As a result, when identifying an abnormal access request, the data responding device 106 may reject the access request or reject subsequent access requests from the same source as the access request, thus ensuring the security of the data responding device 106. The same source here may be from the same device, from the same IP address, from the same service system, or from the same cluster, the same machine room, the same physical region, and so on.

According to different application scenarios and requirements, the data processing device 104 and the data responding device 106 may work together in, but not limited to, the following two alternative implementations.

In an example implementation 1, when the access request sent by the user to the data responding device 106 through his/her terminal 102 enters a network where the data responding device 106 is located, the access request may be replicated and distributed. One replicate is sent to the data responding device 106 which will access and process the access request, and the other replicate is sent to the data processing device 104 for anomaly identification. The data flow of this implementation 1 is as shown by the solid line in FIG. 1. For example, the access request may be replicated and distributed by a distributing device. The access request may be an abnormal request or a normal request, and the access request is processed in two paths by means of replication. As such, the promptness of the response to the access request may be ensured when the access request is a normal request. Certainly, if the data processing device 104 identifies that the access request is an abnormal request, the data processing device 104 may timely notify the data responding device 106 to reject subsequent access requests from the same source as the access request, thus ensuring the security of the data responding device 106. For example, there may be a variety of notification manners. For example, a notification message may be sent to the data responding device 106, or a device ID from which the access request is sent may be added to an abnormal device library so that the data responding device 106 may reject subsequent access requests from the same source as the access request by referring to the abnormal device library.

In an example implementation 2, when the access request sent by the user to the data responding device 106 through his/her terminal 102 enters a network where the data responding device 106 is located, the data processing device 104 may first intercept the access request and perform anomaly identification, and continue to send it to the data responding device 106 if it is a normal access request and block it if it is an abnormal access request. The data flow of this implementation 2 is as shown by the dotted line in FIG. 1. The data responding device 106 may further acquire the processed normal access request from the data processing device 104 and access and process the normal access request.

The access request is not limited by either of the implementations. For example, the access request may be used to view files (or information, data, content, etc.), delete files (or information, data, content, etc.), save files (or information, data, content, etc.), and so on. Similarly, abnormal requests may be defined flexibly according to application requirements. For example, in some application scenarios, access requests that are sent more frequently than a set requirement may be defined as abnormal requests. In some application scenarios, access requests from specific IP addresses may be defined as abnormal requests. In some application scenarios, access requests from specific devices may be defined as abnormal requests. In some application scenarios, access requests that conform to set features may also be defined as abnormal requests, and so on.

In addition, in either of the above example implementations, after the data responding device 106 accesses and processes the access request, the corresponding response data may be directly sent to the terminal 102 without being forwarded by the data processing device 104. Certainly, the response data sent by the data responding device 106 to the terminal 102 may also be forwarded by the data processing device 104.

In this example embodiment, the terminal 102 may be connected with the data processing device 104 and the data responding device 106 over a network. The network connection may be wireless or wired network connection. If the terminal 102, the data processing device 104, and the data responding device 106 are in communication connection, the network type of the mobile network may be any of 2G (GSM), 2.5G (GPRS), 3G (WCDMA, TD-SCDMA, CDMA2000, UTMS), 4G (LTE), 4G+ (LTE+), WiMax, and so on.

It should be noted that there may be a variety of manners of performing anomaly identification on the access request by the data processing device 104. In the example embodiment of the present disclosure, the data processing device 104 performs anomaly identification on the access request by using a previously trained machine learning model. Further, considering that the number of access requests may be large, if the machine learning model is used to perform anomaly identification on all the access requests, a lot of computing resources will be consumed and the operating performance of the data processing device 104 may be easily reduced. In this regard, in the example embodiment of the present disclosure, the data processing device 104 first performs type identification on the access request, and further performs anomaly identification on an access request of a specific type by using a machine learning model, and anomaly identification does not need to be performed on an access request of a non-specific type by using the machine learning model. As such, the number of access requests on which anomaly identification needs to be performed by the machine learning model may be reduced, which is conducive to saving computing resources and improving the operating performance of the data processing device 104.

The process of performing anomaly identification on the access request by the data processing device 104 is described in detail in the following with reference to the method example embodiment.

FIG. 2 is a schematic flowchart of a data processing method according to another exemplary example embodiment of the present disclosure. The method 200 provided in the example embodiment of the present disclosure is performed by a data processing device. The method 200 includes the following steps.

In 202, a to-be-processed access request is acquired.

In 204, a communication traffic feature and a content structure feature of the to-be-processed access request are generated according to information carried in the to-be-processed access request.

In 206, type identification is performed on the to-be-processed access request according to the communication traffic feature and the content structure feature.

In 208, anomaly identification is performed on the to-be-processed access request by using a machine learning model when the to-be-processed access request is identified as a first-type access request.

For example, the to-be-processed access request may be an access request of an HTTP type, may be an HTTP request for playing back a video, an HTTP request for deleting a file, an HTTP request for saving music or data, and so on. Certainly, the to-be-processed access request is not limited to the access request of the HTTP type.

It should be appreciated that the HTTP request for playing back a video is used to request the data responding device to send a video stream of a designated video. The HTTP request for deleting a file is used to request the data responding device to delete a designated file stored in a region of the data responding device. The HTTP request for saving music or data is used to request the data responding device to save a music stream or data uploaded by a terminal into a storage region of the data responding device.

For example, if the to-be-processed access request is an HTTP request, the process of acquiring the to-be-processed access request includes: filtering out an access request of an HTTP type from received access requests as the to-be-processed access request according to a port ID of the access request, such as a port number or a port type.

It should be noted that the to-be-processed access request may be a real-time access request, or a non-real-time access request. For example, if the o-be-processed access request is a real-time access request, anomaly identification may be performed on the access request timely, which is conducive to improving the time efficiency.

In addition to anomaly identification, access processing also needs to be performed on the to-be-processed access request. The two operations may be performed either in parallel or in sequence. Sequential performing refers to first performing anomaly identification on the to-be-processed access request, and continuing to perform access processing on the to-be-processed access request when the to-be-processed access request is identified as a normal request. Parallel performing refers to sending the to-be-processed access request into two paths, one for performing anomaly identification on the to-be-processed access request, and the other for performing access processing on the to-be-processed access request; wherein the two paths are performed in parallel. It should be noted that in the scenario of parallel performing, a result of anomaly identification for the to-be-processed access request may be used to guide the data responding device to perform access processing on subsequent access requests from the same source.

For example, as stated above, after the access request of an HTTP type is filtered out, the access request of an HTTP type may be replicated. One replicate is sent to the data processing device for anomaly identification, and the other replicate is sent to the data responding device for access processing. As such, the normal access to the access request will not be delayed, the promptness of the access request may be ensured, and at the same time, anomaly identification may also be performed on the access request.

There may be one or more to-be-processed access requests. The information carried in the to-be-processed access request includes information related to to-be-accessed data, such as a video ID, music stream information, an access path, and an access file ID, and may also include information that may represent the source of the access request, such as an ID, an IP address, a port number, and an MAC address and the like of a sending device.

After the to-be-processed access request is acquired, type identification may be performed on the to-be-processed access request according to the information carried in the to-be-processed access request.

The carried information refers to complete data information sent by the terminal, whose length is very inconsistent, unlimited and variable. The type of the access request may be flexibly defined according to different application scenarios and requirements. In this example embodiment, access requests are classified into two types, namely, first-type access requests and second-type access requests. The first-type access request refers to an access request with a risk of being abnormal or a relatively high risk of being abnormal, which is higher than a preset threshold, while the second-type access request refers to an access request without a risk of being abnormal or a relatively low risk of being abnormal, which is not higher than the preset threshold. For example, the first-type access request may include, but is not limited to, a suspected webshell access request or a webshell access request. Webshell is a backdoor file left on the data responding device and used for subsequent control after an illegal intruder such as a hacker intrudes the data responding device. The hacker sends an instruction to the webshell backdoor file so as to control the server to add or delete a file, create a new user, and so on. When the to-be-processed access request is identified as a first-type access request, it indicates that the to-be-processed access request has a risk of being abnormal or a relatively high risk of being abnormal, and a machine learning model is further used to perform anomaly identification on the to-be-processed access request. For example, the second-type request is a non-suspicious access request or low-risk access request.

The communication traffic feature refers to basic feature information of the information carried in the to-be-processed access request or basic feature information in the traffic generated by the to-be-processed access request, for example, a sending device ID (e.g., a host ID from which the access request is sent, such as a host IP), an access path (e.g., a URL), an access file ID and a keyword (e.g., description information of a key in a key-value in the access request, such as key=name).

The content structure feature refers to a content structure of the information carried in the to-be-processed access request. The content structure feature may uniquely identify the to-be-processed access request, and one to-be-processed access request only corresponds to one content structure feature. The content structure feature may be a string of characters.

The machine learning model refers to a model that may perform anomaly identification on the access request, and may be obtained by previous training. For example, the machine learning model may be, but is not limited to, a Parameter Server model.

It should be noted that the parameter server model includes a computing node and a parameter service node. The computing node is responsible for performing local model training on training data (blocks) assigned to it locally and updating corresponding parameters. The parameter service node stores a part of global parameters by means of distributed storage and accepts a parameter query and an update request of the compute node. The computing node may also use the trained local model to process to-be-processed data assigned to it locally, for example, use the local model to perform anomaly identification.

For example, performing anomaly identification on the to-be-processed access request may be judging whether the to-be-processed access request is an illegal or malicious access request. For example, as stated above, after a possible webshell access request is identified from a plurality of access requests of an HTTP type, the possible webshell access request is input to the parameter server model for secondary identification to determine whether the access request is a webshell access request, thus implementing further accurate identification of the webshell-type access request.

It should be noted that the possible webshell access request identified through step 204 may achieve an accuracy up to 99%. In order to identify the webshell access request more accurately, the possible webshell access request identified through step 204 is filtered again by using the machine learning model to identify a final webshell access request, thus reducing a misjudgment rate. Further, after the final webshell access request is identified, feature extraction may be performed on the webshell access request finally identified, for improving a current webshell feature library.

For example, generating a communication traffic feature and a content structure feature of the to-be-processed access request according to information carried in the to-be-processed access request includes: extracting a device ID, an access path, an access file ID, and a keyword from the information carried in the to-be-processed access request, to form a baseline feature corresponding to the to-be-processed access request, as the communication traffic feature; and generating, according to a keyword in the information carried in the to-be-processed access request and a matching result between the information carried in the to-be-processed access request and each regular expression in an abnormal communication rule, a signature corresponding to the to-be-processed access request, as the content structure feature.

The baseline feature refers to basic feature information of the information carried in the to-be-processed access request, for example, the baseline feature includes, but is not limited to, a sending device ID (e.g., a host ID from which the access request is sent, such as a host IP), an access path (e.g., a URL), an access file ID and a keyword (e.g., description information of a key in a key-value in the access request, such as key=name). An optional manner of acquiring the baseline feature is parsing the to-be-processed access request to obtain carried information, acquiring, from the carried information resulted from parsing, a sending device ID (e.g., a host ID from which the access request is sent, such as a host IP), an access path (e.g., a URL), an access file ID and a keyword, and generating a baseline feature corresponding to a to-be-processed access request. It should be appreciated that the baseline feature is the communication traffic feature.

A signature may uniquely identify a to-be-processed access request, and one to-be-processed access request corresponds to only one signature, which may be a string of characters. For example, the manner of generating a signature includes, but is not limited to, generating, according to a keyword in the information carried in the to-be-processed access request and a matching result between information carried in each to-be-processed access request and each regular expression, a signature corresponding to the to-be-processed access request. It should be appreciated that the signature is the content structure feature.

The abnormal communication rule is a webshell rule which includes a plurality of regular expressions. The webshell rule specifies, through the regular expressions, characters or information or content that will be carried by a webshell access request.

For example, each piece of information in the information carried in the to-be-processed access request may be matched with each of the regular expressions in the webshell rule, or some of the information carried in the to-be-processed access request may be selected to be matched with each of the regular expressions in the webshell rule, for example, an access path and an access file name may be selected.

For example, as stated above, the to-be-processed access request is parsed to obtain carried information, and various pieces of key data in the carried information are arranged sequentially to form a key combination (or arranged non-sequentially). For example, the carried information is sent in a form of a message. The sequence recorded in the message is: key1key2key3, and key1=A, key2=B, key3=C; then, the sequential arrangement of the keys is key1key2key3=ABC. Afterwards, each piece of information (i.e., each piece of data) in the carried information is matched with each of the regular expressions in the webshell rule to obtain a plurality of matching results. For example, information of the URL "xxx" is matched with each of the regular expressions. When the URL "xxx" matches a first regular expression in the webshell rule, it is determined that the matching result is 1. If the information of the URL "xxx" does not match a second regular expression "IP=yyy", it is determined that the matching result is 0. By repeating similarly, the matching results between the information of the URL "xxx" and all the regular expressions are determined, for example, "000 . . . 111". A plurality of matching results between the next piece of information, e.g., an access file name "yyy" in the information carried in the to-be-processed access request and all the regular expressions are then determined, and so on so forth, until all pieces of information in the information carried in the to-be-processed access request have been traversed. A combination of a plurality of matching results corresponding to each piece of information is determined, for example, "000 . . . 111 . . . 10100 . . . 10110", and it is finally determined that a signature of the to-be-processed access request is "ABC000 . . . 111 . . . 10100 . . . 10110".

For example, a normal traffic baseline library and an abnormal traffic signature library may be generated in advance. Traffic baselines corresponding to normal access requests are stored in the normal traffic baseline library, which are referred to as normal traffic baselines. Traffic signatures corresponding to abnormal access requests are stored in the abnormal traffic signature library, which are referred to as abnormal traffic signatures. Based on this, as shown in FIG. 3, performing type identification on the to-be-processed access request according to the communication traffic feature and the content structure feature includes: step 302, matching the baseline feature and the signature of the to-be-processed access request with a normal traffic baseline library and an abnormal traffic signature library respectively; and step 304, when the baseline feature of the to-be-processed access request does not match a normal traffic baseline and the signature of the to-be-processed access request matches an abnormal traffic signature, determining that the to-be-processed access request is the first-type access request.

For example, the abnormal traffic signature library has been stored in the data processing device.

In step 302, the baseline feature and the signature of the to-be-processed access request are matched with a normal traffic baseline library and an abnormal traffic signature library respectively.

Traffic baselines corresponding to normal access requests, that is, normal traffic baselines, are stored in the normal traffic baseline library. A baseline feature library has been stored in the data processing device. The normal traffic baselines refer to basic feature information of the information carried in the normal access requests. For example, the normal traffic baselines include, but are not limited to, a sending device ID (e.g., a host ID from which the access request is sent, such as a host IP), an access path (e.g., a URL), an access file ID and a keyword (e.g., description information of a key in a key-value in the access request, such as key=name).

It should be appreciated that the normal traffic baseline is the same as the feature information attribute included in the above baseline feature. The feature information attribute refers to the "device ID", instead of the value corresponding to the device ID, for example, the ID "001".

Traffic signatures corresponding to abnormal access requests, that is, abnormal traffic signatures, are stored in the abnormal traffic signature library. The abnormal traffic signatures refer to information that may uniquely identify the abnormal access requests. The abnormal traffic signature is also generated by a keyword combination (i.e., a "key combination") in information carried in the abnormal access requests and a combination of a plurality of matching results (formed by "0" or "1"). The combination of a plurality of matching results means a combination of matching results obtained by first matching each piece of information (data) in the carried information with each of the regular expressions in the webshell rule respectively.

For example, the matching operation in step 302 may be performed in an execution manner 1, that is, the baseline feature is matched with the normal traffic baseline library at first, and then the signature is matched with the abnormal traffic signature library. Alternatively, the matching operation in step 302 may also be performed in an execution manner 2, that is, the signature is matched with the abnormal traffic signature library at first, and then the baseline feature is matched with the normal traffic baseline library.

In step 304, when the baseline feature of the to-be-processed access request does not match a normal traffic baseline and the signature of the to-be-processed access request matches an abnormal traffic signature, it is determined that the to-be-processed access request is the first-type access request.

The baseline feature not matching a normal traffic baseline means data corresponding to any piece of feature information in the baseline feature being not present in data corresponding to the normal traffic baseline. The signature of the to-be-processed access request matching an abnormal traffic signature means the signature being present in the abnormal traffic signature library.

In addition, when the baseline feature of the to-be-processed access request matches a normal traffic baseline and the signature of the to-be-processed access request does not match an abnormal traffic signature, it is determined that the to-be-processed access request is the second-type access request. For example, when the data processing device intercepts the to-be-processed access request, the to-be-processed access request determined as the second-type access request is sent to the corresponding data responding device, so that the data responding device may make data response according to the second-type access request. When the data processing device replicates and distributes the to-be-processed access request, the data processing device does not perform any processing on the second-type access request.

It should be appreciated that the normal traffic baseline should be that each feature information attribute includes a plurality of feature values, such as the host IP "xxx", "yyy", . . . , and "zzz". The abnormal traffic signature also includes a plurality of signatures.

For example, as shown in FIG. 4, matching the baseline feature and the signature of the to-be-processed access request with a normal traffic baseline and an abnormal traffic signature respectively includes the following steps.

In step 402, the baseline feature of the to-be-processed access request is matched with the normal traffic baseline library.

For example, the matching manner may be comparing each piece of feature information in the baseline feature with feature information in each of the normal traffic baselines in the normal traffic baseline library respectively.

In step 404, when the baseline feature of the to-be-processed access request does not match a normal traffic baseline, the signature of the to-be-processed access request is matched with the abnormal traffic signature library.

When any piece of feature information in the baseline feature is different from all pieces of feature information of all the normal traffic baselines in the normal traffic baseline library, it is considered that the baseline feature does not match the normal traffic baseline. In this case, the signature of the to-be-processed access request is matched with the abnormal traffic signature library. For example, the matching manner may be comparing a unique signature of the to-be-processed access request with each of abnormal traffic signatures in the abnormal traffic signature library.

In step 406, when the signature of the to-be-processed access request matches an abnormal traffic signature, it is determined that the to-be-processed access request is the first-type access request. If the signature is the same as at least one abnormal traffic signature, it is regarded as the situation when the signature of the to-be-processed access request matches an abnormal traffic signature, and thus the to-be-processed access request is the first-type access request.

In example, the method 200 further includes: when the baseline feature of the to-be-processed access request does not match a normal traffic baseline and the signature of the to-be-processed access request does not match an abnormal traffic signature, determining an access address corresponding to the to-be-processed access request, and counting on the number of accesses to the access address within a preset time, and when the number of accesses is less than a set threshold, determining that the to-be-processed access request is the first-type access request.

Counting on the number of accesses to the access address may be counting on the number from the dimension of accessing devices, that is, counting on the number of devices that initiate access to the access address. Different devices that initiate access to the access address may be identified according to MAC addresses or device IDs. Certainly, in a scenario where an IP address is fixed, different devices that initiate access to the access address may also be identified according to the IP address.

For example, as stated above, if the baseline feature does not match a normal traffic baseline and the signature does not match an abnormal traffic signature, an access path URL, such as "aaa", is determined from data carried in the to-be-processed access request. Moreover, from this point on, when a preset time arrives, e.g., 1 minute, the number of accessing hosts that access the URL "aaa" is determined. When the number of the accessing hosts is less than a threshold, e.g., "50", it is determined that the to-be-processed access request is the first-type access request.

It should be appreciated that counting on the number of accesses to the access address may also be counting on the number from the dimension of requests. That is, the number of access requests requesting access to the access address within a preset time is counted. The access requests here include access requests from different devices as well as a plurality of access requests from the same device.

For example, the method 200 further includes: when the baseline feature of the to-be-processed access request matches a normal traffic baseline, or when the number of accesses is greater than or equal to the set threshold, determining that the to-be-processed access request is a second-type access request.

For example, as stated above, if the baseline feature matches a normal traffic baseline, it is directly determined that the to-be-processed access request is a second-type access request. Alternatively, if the number of accessing hosts is greater than a threshold, e.g., "50", it is directly determined that the to-be-processed access request is a second-type access request.

For example, before the baseline feature and the signature of the to-be-processed access request are matched with a normal traffic baseline library and an abnormal traffic signature library respectively, the method 200 further includes: acquiring at least one historical access request; identifying a first-type historical access request and a second-type historical access request from the at least one historical access request according to the abnormal communication rule; and generating an abnormal traffic signature library according to information carried in the first-type historical access request, and generating a normal traffic baseline library according to information carried in the second-type historical access request.

The historical access request refers to access requests sent by the terminal to the data responding device within a period of time prior to the current moment. Normal access requests existing in the historical access requests may be obtained based on experimental data, for example, access requests sent by a simulation terminal accessing the data responding device. Webshell access requests existing in the historical access requests may be acquired from webshell access requests actually received by the data responding device. The two types of access requests are mixed to form historical access requests. For example, the historical access requests are historical access requests in a week before the current time.

The abnormal communication rule is a webshell rule that includes a plurality of regular expressions. The webshell rule means that characters or information or content that the webshell access request will carry is specified through the regular expressions, for example, a regular expression indicating an access address, a regular expression indicating an access file name, and so on. The regular expression refers to a logical formula for operating a character string, that is, a "a character string of a rule" is formed by some predefined particular characters and combinations of the characters. The "a character string of a rule" is used to express a logic for filtering character strings, for retrieving or querying data, information, content, and so on.

For example, as stated above, a plurality of historical access requests in the previous week are acquired. When a historical access request matches the webshell rule, the historical access request is the first-type access request. At the same time, an abnormal traffic signature of the first-type access request is determined and stored, thus finally forming an abnormal traffic signature library that includes a plurality of abnormal traffic signatures. When the historical access request does not match the webshell rule, it is determined that the historical access request is the second-type access request. At the same time, a normal traffic baseline of the historical access request which is determined as the second-type access request is acquired and stored, thus forming a normal traffic baseline library that includes a plurality of abnormal traffic baselines.

For example, identifying a first-type historical access request and a second-type historical access request from the at least one historical access request according to the abnormal communication rule includes: matching information carried in each historical access request and information carried in a response message corresponding to each historical access request with a plurality of regular expressions respectively; taking a historical access request with information carried therein and information carried in the corresponding response message both matching at least one regular expression, as the first-type historical access request; and taking the remaining historical access requests other than first-type historical access requests as second-type historical access requests.

The response message refers to a data unit exchanged and transmitted over the network. Response message data includes complete data information sent by the data responding device, whose length is very inconsistent, unlimited and variable, for example, a data responding device ID, a response status ID, a response text information, and so on.

For example, the information carried in the historical access request matching at least one regular expression is: data corresponding to an access path in the carried information being the same as data in the at least one regular expression in the webshell rule.

For example, the information carried in the historical access request not matching any regular expression is: all the data in the carried information being different from the data in all the regular expressions in the webshell rule.

For example, the information carried in the response message matching at least one regular expression is: data corresponding to the response text information in the information carried in the response message being the same as the data in the at least one regular expression.

For example, the information carried in the response message not matching any regular expression is: all the data in the information carried in the response message being different from the data in all the regular expressions in the webshell rule.

For example, as stated above, if at least one piece of information in the information carried in the historical access request matches any regular expression (for example, the information is exactly the same as the regular expression or the information includes the regular expression) and at least one piece of information in the information carried in the response message matches any regular expression, the historical access request is the first-type access request. After one piece of information in the information carried in the historical access request or in the response message matches a regular expression, the piece of information does not need to be matched with other regular expressions. If all pieces of information in the information carried in the historical access request do not meet all the regular expressions in the webshell rule or all pieces of information in the information carried in the response message do not meet all the regular expressions in the webshell rule, it is determined that the historical access request is the second-type access request.

When the information carried in the historical access request matches at least one regular expression but the information carried in the response message does not match any regular expression, the historical access request is the second-type access request.

When the information carried in the response message corresponding to the historical access request matches at least one regular expression but the information carried in the historical access request does not match any regular expression, the historical access request is the second-type access request.

For example, generating an abnormal traffic signature library according to feature data of the first-type historical access request includes: for each historical access request in the first-type historical access requests, generating an abnormal traffic signature corresponding to the historical access request according to a keyword in the information carried in the historical access request and a matching result between information carried in the historical access request and each regular expression included in the abnormal communication rule, wherein abnormal traffic signatures corresponding to various historical access requests in the first-type historical access requests form the abnormal traffic signature library.

Since the process of generating an abnormal traffic signature is the same as the process of generating a signature of the to-be-processed access request described above, it will not be described in detail here.

For example, generating a normal traffic baseline library according to feature data of the second-type historical access request includes: for each historical access request in the second-type historical access requests, extracting a device ID, an access path, an access file ID, and a keyword from information carried in the historical access request to form a normal traffic baseline corresponding to the historical access request, wherein normal traffic baselines corresponding to various historical access requests in the second-type historical access requests form the normal traffic baseline library. Since the process of forming a normal traffic baseline is the same as the process of acquiring a baseline feature of the to-be-processed access request, it will not be described in detail here. For example, the method 200 further includes: when the to-be-processed access request is identified as a second-type access request, allowing the to-be-processed access request to directly access a corresponding data responding device.

For example, as described above, after the data processing device intercepts the access request of an HTTP type that has been filtered out and identifies the second-type access request therein, the interception of the second-type access request is canceled, so that the second-type access request is allowed to access the corresponding data responding device, and the data responding device returns response data to the terminal in response to the second-type access request.

For example, before access processing is performed on the to-be-processed access request, anomaly identification is first performed on the to-be-processed access request. Then, in the application scenario, the method 200 further includes: when the machine learning model identifies that the to-be-processed access request is an abnormal access request, forbidding the to-be-processed access request from being sent to a corresponding data responding device; or when the machine learning model identifies that the to-be-processed access request is an abnormal access request, adding a device ID corresponding to the to-be-processed access request to an abnormal device library for a corresponding data responding device to reject subsequent access requests from the device ID.

For example, the manner of forbidding the to-be-processed access request is as follows: after the data processing device intercepts the access request of an HTTP type that has been filtered out, the webshell access request identified by the machine learning model may be directly discarded.

The abnormal device library refers to a database storing a plurality of device IDs from which abnormal access requests are sent. For example, the abnormal access requests are webshell access requests. For example, the host ID in the webshell access request identified by the machine learning model may be stored into a corresponding region, thus forming an abnormal device library having a plurality of host IDs to facilitate other data responding devices to subsequently read the host IDs in the abnormal device library and then help other data responding devices to identify the received webshell access request.

In other examples, the to-be-processed access request is replicated and distributed, in one path, access processing is performed on the to-be-processed access request, and in the other path, anomaly identification is performed on the to-be-processed access request. In the application scenario, when the machine learning model identifies that the to-be-processed access request is an abnormal access request, a device ID corresponding to the to-be-processed access request may be added to the abnormal device library for the corresponding data responding device to reject subsequent access requests from the device ID. Alternatively, a corresponding data responding device may be determined according to an access address in the webshell access request, and a blocking notification is sent to the corresponding data responding device. The device ID from which the webshell access request is sent is carried in the blocking notification, so that the corresponding data responding device may reject access of subsequent webshell access requests from the device ID.

The technical solution of the present disclosure is described in detail in the following with reference to exemplary application scenarios.

Scenario 1: In an application scenario where a cloud server provides a video playback service to a cloud client terminal, the cloud client terminal is installed on a terminal of a user. When the user needs to play back a video provided by the cloud server, the user may operate the cloud client terminal on the terminal to send a video playback request to the cloud server. In the application scenario, the cloud server has an abnormal request identification function provided in the foregoing example embodiment of the present disclosure. After receiving the video playback request sent by the cloud client terminal, the cloud server first judges whether the video playback request is an access request of an HTTP type. If the judgment result is yes, a baseline feature of the video playback request is acquired and matched with normal traffic baselines in a normal traffic baseline library. If the baseline feature of the video playback request does not match a normal traffic baseline, it may be determined that the video playback request may be a suspected webshell access request. Then, a signature of the video playback request is acquired and matched with signatures in an abnormal traffic signature library. If the signature of the video playback request matches an abnormal traffic signature, it is determined that the video playback request may be a suspected webshell access request, and the video playback request is sent to the machine learning model for anomaly identification to finally determine through the machine model whether the video playback request is a webshell access request.

Scenario 2: In an application scenario where a cloud server provides a video playback service to a cloud client terminal, the cloud client terminal is installed on a terminal of a user. When the user needs to play back a video provided by the cloud server, the user may operate the cloud client terminal on the terminal to send a video playback request to the cloud server. In the application scenario, an anomaly identification server is further deployed. The anomaly identification server has an abnormal request identification function provided in the foregoing example embodiment of the present disclosure. In this example embodiment, the video playback request may be replicated into two copies, one is sent to the cloud server, and the other is sent to the anomaly identification server.

After receiving the video playback request, the cloud server acquires corresponding video content and returns it to the cloud client terminal for playback, ensuring that the user may timely see the related video content.

After receiving the video playback request, the anomaly identification server acquires a baseline feature of the video playback request and matches the baseline feature with normal traffic baselines in a normal traffic baseline library. If the baseline feature of the video playback request does not match a normal traffic baseline, it is determined that the video playback request may be a suspected webshell access request. Then, a signature of the video playback request is acquired and matched with signatures in an abnormal traffic signature library. If the signature of the video playback request matches an abnormal traffic signature, it is determined that the video playback request may be a suspected webshell access request, and the video playback request is sent to the machine learning model for anomaly identification to finally determine through the machine model whether the video playback request is a webshell access request.

For example, if the signature of the video playback request does not match an abnormal traffic signature in the above process, the anomaly identification server may acquire an access address of the video playback request, and from this point on, start counting the number of hosts initiating access to the access address within a preset time of 1 minute. When the number is greater than a threshold, e.g., 50, it is determined that the video playback request is a normal access request. When the number is less than or equal to the threshold, e.g., 50, it is determined that the video playback request is a suspected webshell access request, and the video playback request is sent to a parameter server model for secondary identification to finally identify whether the video playback request is a webshell access request and output an identification result.

When it is identified that the video playback request is a webshell access request, related information of the video playback request, for example, the device ID, is provided to the cloud server, so that the cloud server terminates providing related video content to the cloud client terminal, or the cloud server rejects subsequent video playback requests from the device ID. As such, subsequent webshell access requests cannot access the cloud server, thus ensuring the security of the cloud server.

Figure 5:
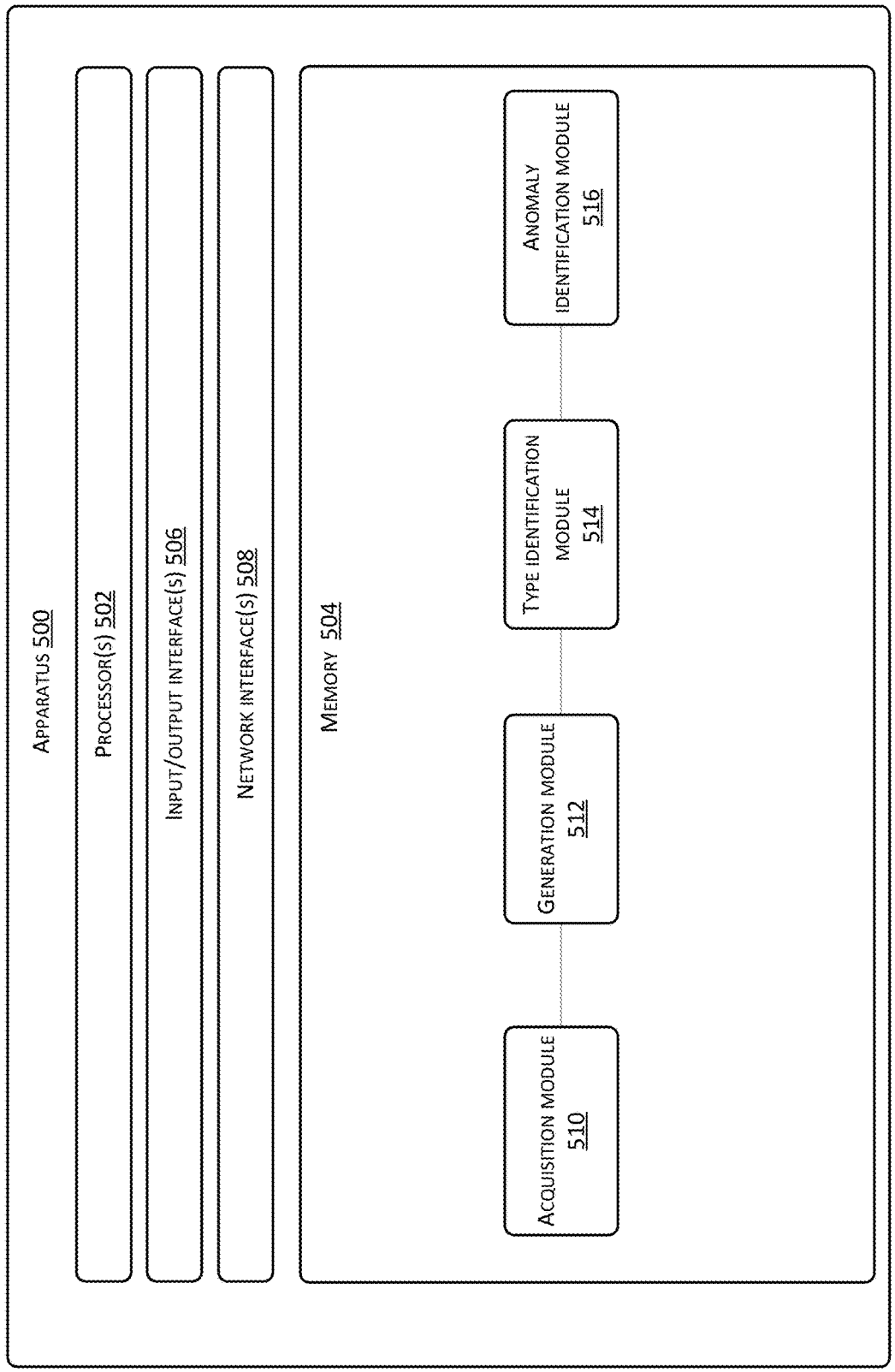
FIG. 5 is a schematic structural block diagram of a data processing apparatus according to yet another exemplary example embodiment of the present disclosure.

FIG. 5 is a schematic structural block diagram of a data processing apparatus according to yet another exemplary example embodiment of the present disclosure. The apparatus 500 is applicable to a data processing device. The apparatus 500 includes one or more processor(s) 502 or data processing unit(s) and memory 504. The apparatus 500 may further include one or more input/output interface(s) 506 and one or more network interface(s) 508. The memory 504 is an example of computer readable medium or media.

The memory 504 may store therein a plurality of modules or units including an acquisition module 510, a generation module 512, a type identification module 514, and an anomaly identification module 516.

The acquisition module 510 is configured to acquire a to-be-processed access request.

The generation module 512 is configured to generate a communication traffic feature and a content structure feature of the to-be-processed access request according to information carried in the to-be-processed access request.

The type identification module 514 is configured to perform type identification on the to-be-processed access request according to the communication traffic feature and the content structure feature.

The anomaly identification module 516 is configured to perform anomaly identification on the to-be-processed access request by using a machine learning model when the to-be-processed access request is identified as a first-type access request.

For example, the generation module 512 includes: a forming unit and a generation unit. The forming unit is configured to extract a device ID, an access path, an access file ID, and a keyword from the information carried in the to-be-processed access request to form a baseline feature corresponding to the to-be-processed access request, as the communication traffic feature; and the generation unit is configured to generate, according to a keyword in the information carried in the to-be-processed access request and a matching result between the information carried in the to-be-processed access request and each regular expression in an abnormal communication rule, a signature corresponding to the to-be-processed access request, as the content structure feature.

Figure 6:
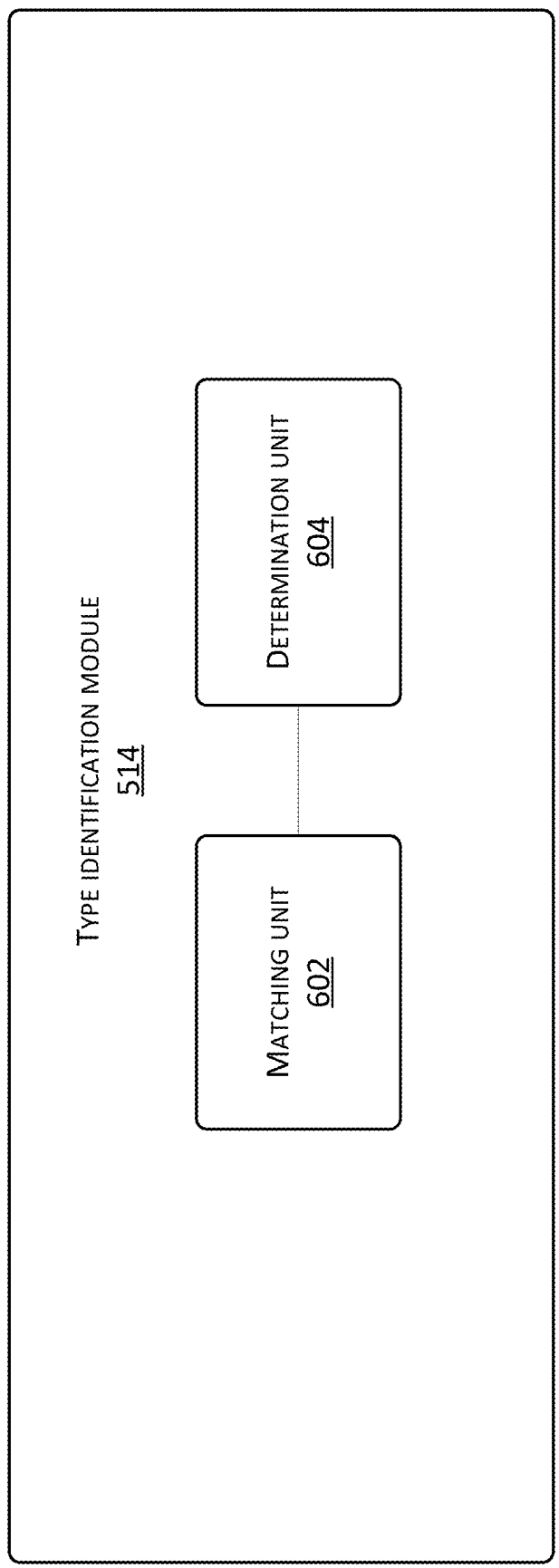
FIG. 6 is a schematic structural block diagram of a type identification module according to yet another exemplary example embodiment of the present disclosure.

For example, as shown in FIG. 6, the type identification module 514 includes: a matching unit 602 configured to match the baseline feature and the signature of the to-be-processed access request with a normal traffic baseline library and an abnormal traffic signature library respectively; and a determination unit 604 configured to, when the baseline feature of the to-be-processed access request does not match a normal traffic baseline and the signature of the to-be-processed access request matches an abnormal traffic signature, determine that the to-be-processed access request is the first-type access request.

For example, the matching unit 602 is specifically configured to: match the baseline feature of the to-be-processed access request with the normal traffic baseline library; when the baseline feature of the to-be-processed access request does not match a normal traffic baseline, match the signature of the to-be-processed access request with the abnormal traffic signature library; and when the signature of the to-be-processed access request matches an abnormal traffic signature, determine that the to-be-processed access request is the first-type access request.

For example, the apparatus 500 further includes: a first determination module configured to, when the baseline feature of the to-be-processed access request does not match a normal traffic baseline and the signature of the to-be-processed access request does not match an abnormal traffic signature, determine an access address corresponding to the to-be-processed access request, and count on the number of accesses to the access address within a preset time, and when the number of accesses is less than a set threshold, determine that the to-be-processed access request is the first-type access request.

For example, the apparatus 500 further includes: a second determination module configured to, when the baseline feature of the to-be-processed access request matches a normal traffic baseline, or when the number of accesses is greater than or equal to the set threshold, determine that the to-be-processed access request is a second-type access request.

For example, the apparatus 500 further includes: an acquisition module configured to acquire at least one historical access request; identify a first-type historical access request and a second-type historical access request from the at least one historical access request according to the abnormal communication rule; and generate an abnormal traffic signature library according to information carried in the first-type historical access request, and generate a normal traffic baseline library according to information carried in the second-type historical access request.

For example, the abnormal communication rule is a webshell rule that includes a plurality of regular expressions.

For example, the acquisition module is specifically configured to: match information carried in each historical access request and information carried in a response message corresponding to each historical access request with a plurality of regular expressions respectively; take a historical access request with information carried therein and information carried in the corresponding response message both matching at least one regular expression, as the first-type historical access request, and take the remaining historical access requests other than first-type historical access requests as second-type historical access requests.

For example, the acquisition module is specifically configured to: for each historical access request in the first-type historical access requests, generate an abnormal traffic signature corresponding to the historical access request according to a keyword in the information carried in the historical access request and a matching result between information carried in the historical access request and each regular expression included in the abnormal communication rule, wherein abnormal traffic signatures corresponding to various historical access requests in the first-type historical access requests form the abnormal traffic signature library.

For example, the acquisition module is specifically configured to: for each historical access request in the second-type historical access requests, extract a device ID, an access path, an access file ID, and a keyword from information carried in the historical access request to form a normal traffic baseline corresponding to the historical access request, wherein normal traffic baselines corresponding to various historical access requests in the second-type historical access requests form the normal traffic baseline library.

For example, the apparatus 500 further includes: an allowing module configured to, when the to-be-processed access request is identified as a second-type access request, allow the to-be-processed access request to directly access a corresponding data responding device.

For example, the apparatus 500 further includes: a forbidding module configured to, when the machine learning model identifies that the to-be-processed access request is an abnormal access request, forbid the to-be-processed access request from being sent to a corresponding data responding device; or when the machine learning model identifies that the to-be-processed access request is an abnormal access request, add a device ID corresponding to the to-be-processed access request to an abnormal device library for a corresponding data responding device to reject subsequent access requests from the device ID.

Figure 7:
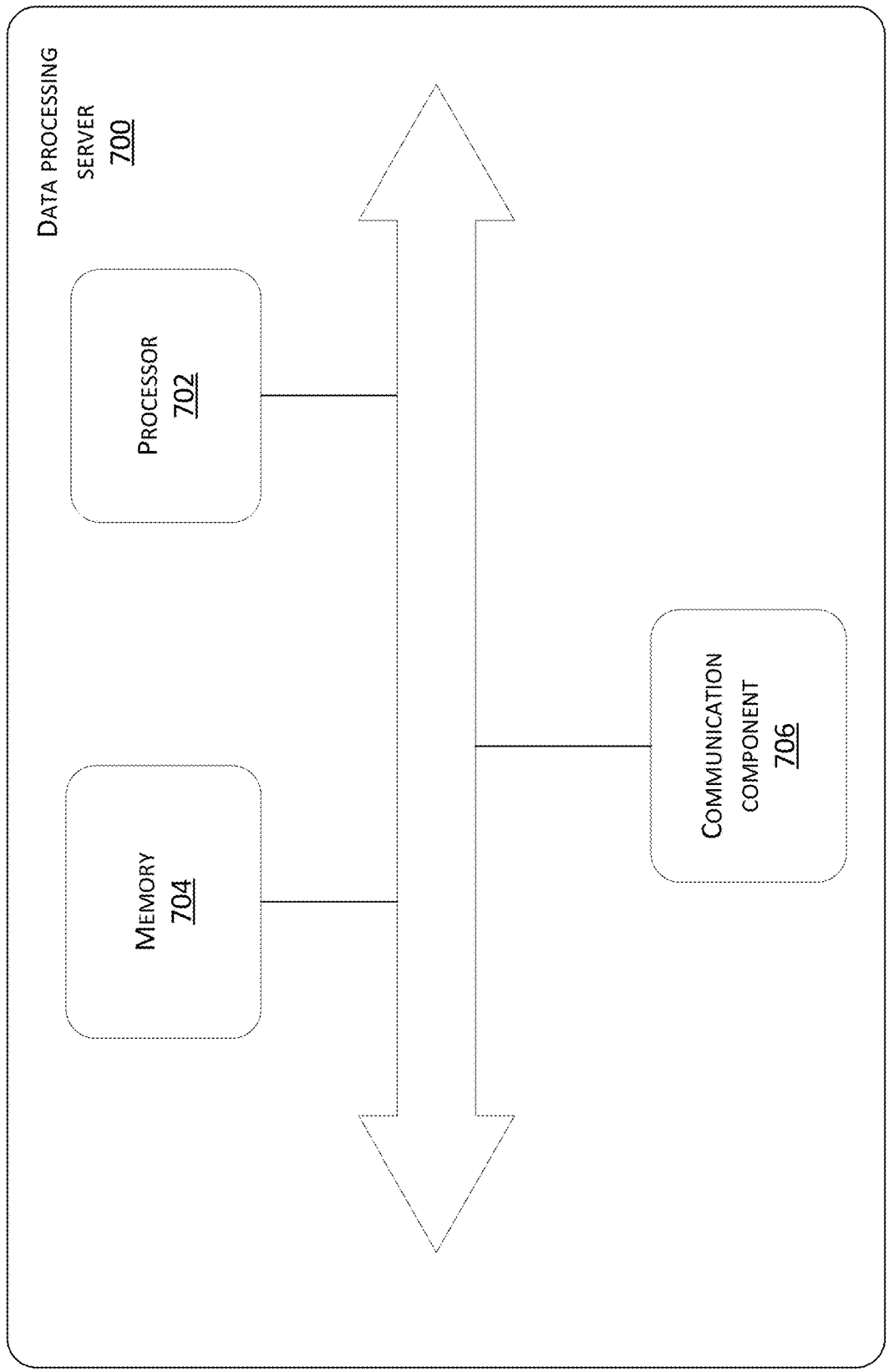
FIG. 7 is a schematic structural diagram of a data processing device according to yet another exemplary example embodiment of the present disclosure.

The above describes the internal functions and structure of the processing apparatus 500 shown in FIG. 5. In a possible design, the structure of the processing apparatus 500 shown in FIG. 5 may be implemented as a data processing server 700. As shown in FIG. 7, the data processing server 700 may include: a processor 702 and a memory 704.

The memory 704 is configured to store computer-readable instructions or a computer program. The memory 704 is an example of computer readable medium or media.

The processor 702 is configured to execute the computer program to:
  acquire a to-be-processed access request; generate a communication traffic feature and a content structure feature of the to-be-processed access request according to information carried in the to-be-processed access request; perform type identification on the to-be-processed access request according to the communication traffic feature and the content structure feature; and perform anomaly identification on the to-be-processed access request by using a machine learning model when the to-be-processed access request is identified as a first-type access request.

For example, the processor 702 is specifically configured to: extract a device ID, an access path, an access file ID, and a keyword from the information carried in the to-be-processed access request to form a baseline feature corresponding to the to-be-processed access request, as the communication traffic feature; and generate, according to a keyword in the information carried in the to-be-processed access request and a matching result between the information carried in the to-be-processed access request and each regular expression in an abnormal communication rule, a signature corresponding to the to-be-processed access request, as the content structure feature.

For example, the processor 702 is specifically configured to: match the baseline feature and the signature of the to-be-processed access request with a normal traffic baseline library and an abnormal traffic signature library respectively; and when the baseline feature of the to-be-processed access request does not match a normal traffic baseline and the signature of the to-be-processed access request matches an abnormal traffic signature, determine the to-be-processed access request as the first-type access request.

In examples, the processor 702 is specifically configured to: match the baseline feature of the to-be-processed access request with the normal traffic baseline library; when the baseline feature of the to-be-processed access request does not match a normal traffic baseline, match the signature of the to-be-processed access request with the abnormal traffic signature library; and when the signature of the to-be-processed access request matches an abnormal traffic signature, determine that the to-be-processed access request is the first-type access request.

For example, the processor 702 is further configured to: when the baseline feature of the to-be-processed access request does not match a normal traffic baseline and the signature of the to-be-processed access request does not match an abnormal traffic signature, determine an access address corresponding to the to-be-processed access request, and count on the number of accesses to the access address within a preset time, and when the number of accesses is less than a set threshold, determine the to-be-processed access request as the first-type access request.

For example, the processor 702 is further configured to: when the baseline feature of the to-be-processed access request matches a normal traffic baseline, or when the number of accesses is greater than or equal to the set threshold, determine that the to-be-processed access request is a second-type access request.

In examples, the processor 702 is further configured to: acquire at least one historical access request; identify a first-type historical access request and a second-type historical access request from the at least one historical access request according to the abnormal communication rule; and generate an abnormal traffic signature library according to information carried in the first-type historical access request, and generate a normal traffic baseline library according to information carried in the second-type historical access request.

For example, the abnormal communication rule is a webshell rule that includes a plurality of regular expressions.

In examples, the processor 702 is further configured to: match information carried in each historical access request and information carried in a response message corresponding to each historical access request with a plurality of regular expressions included in the abnormal communication rule respectively; and take a historical access request with information carried therein and information carried in the corresponding response message both matching at least one regular expression, as the first-type historical access request, and take the remaining historical access requests other than first-type historical access requests as the second-type historical access requests.

For example, the processor 702 is specifically configured to: for each historical access request in the first-type historical access requests, generate an abnormal traffic signature corresponding to the historical access request according to a keyword in the information carried in the historical access request and a matching result between information carried in the historical access request and each regular expression included in the abnormal communication rule, wherein abnormal traffic signatures corresponding to various historical access requests in the first-type historical access requests form the abnormal traffic signature library.

For example, the processor 702 is specifically configured to: for each historical access request in the second-type historical access requests, extract a device ID, an access path, an access file ID, and a keyword from information carried in the historical access request to form a normal traffic baseline corresponding to the historical access request, wherein normal traffic baselines corresponding to various historical access requests in the second-type historical access requests form the normal traffic baseline library.

For example, the data processing server 700 may include: a communication component 706, wherein the processor 702 is further configured to, when the to-be-processed access request is identified as a second-type access request, allow the to-be-processed access request to directly access a corresponding data responding device through the communication component 706.

For example, the processor 702 is further configured to: when the machine learning model identifies that the to-be-processed access request is an abnormal access request, forbid the to-be-processed access request from being sent to a corresponding data responding device; or when the machine learning model identifies that the to-be-processed access request is an abnormal access request, add a device ID corresponding to the to-be-processed access request to an abnormal device library for a corresponding data responding device to reject subsequent access requests from the device ID.

In the example embodiment of the present disclosure, the data processing device performs type identification on the to-be-processed access request, and when identifying the to-be-processed access request as a first-type access request, performs anomaly identification on the to-be-processed access request by using a machine learning model, which may accurately identifies an abnormal access request, and at the same time, effectively reduce the number of access requests that need to be identified by the machine learning model, thus saving computing resources of the cloud server and improving the performance of the cloud server.

In addition, a computer storage medium is provided in an example embodiment of the present disclosure. When executed by one or more processors, the computer program causes the one or more processors to perform the steps in the data processing method in the method example embodiment shown in FIG. 2.

In addition, some procedures of the description in the above example embodiments and the drawings include a plurality of operations appearing in a particular order. However, it should be clearly understood that these operations may be performed in an order other than that described herein or may be performed in parallel. Serial numbers of the operations such as 202, 204, and 206, are only used to distinguish different operations, and the serial numbers do not represent any performing order. Besides, the procedures may include more or fewer operations, and the operations may be performed in sequence or in parallel. It should be noted that the descriptions such as "first" and "second" herein are used to distinguish different messages, devices, modules, and so on, and do not represent a sequence. Moreover, it is not limited that "first" and "second" are different types.

The apparatus example embodiment described above is merely schematic. The units described as separate parts may or may not be physically separate, and parts displayed as units may or may not be physical units, may be located in one position, or may be distributed on a plurality of network units. Some or all of the modules may be selected according to actual needs to achieve the objectives of the solutions of the example embodiments. Those of ordinary skill in the art may understand and implement the solutions without creative efforts.

From the description of the implementations above, those skilled in the art may clearly understand that the implementations may be implemented by software plus a necessary universal hardware platform, and may also be implemented in a manner of combining hardware and software. Based on such an understanding, the above technical solutions essentially, or the portion contributing to the prior art may be embodied in the form of a computer product. The present invention may be in a form of a computer program product implemented on a computer usable storage medium (including, but not limited to, a disk memory, a CD-ROM, an optical memory and so on) that includes computer usable program code.

The present invention is described with reference to the flowcharts and/or block diagrams of the methods, the devices (systems) and the computer program products in the example embodiments of the present invention. It should be understood that each process and/or block in the flowcharts and/or the block diagrams and a combination of processes and/or blocks in the flowcharts and/or the block diagrams may be implemented by computer program instructions. The computer program instructions may be provided to a processor of a general-purpose computer, a special-purpose computer, an embedded processor or other programmable multimedia data processing devices to produce a machine, so as to generate an apparatus configured to implement functions specified in one or more processes of the flowcharts and/or one or more blocks in the block diagrams through instructions executed by the processor of a computer or other programmable multimedia data processing devices.

The computer program instructions may also be stored in a computer-readable memory which may direct the computer or other programmable multimedia data processing devices to operate in a particular manner, such that the instructions stored in the computer-readable memory produce an article of manufacture including instruction means, where the instruction means implements functions specified in one or more processes of the flowcharts and/or one or more blocks in the block diagrams.

The computer program instructions may also be loaded onto the computer or other programmable multimedia data processing devices, so as to execute a series of operation steps on the computer or other programmable devices to generate processing implemented by the computer, so that the instructions executed on the computer or other programmable devices provide steps for implementing functions specified in one or more processes of the flowcharts and/or one or more blocks in the block diagrams.

In a typical configuration, the computer includes one or more central processing units (CPUs), an input/output interface, a network interface, and a memory.

The memory may include computer readable media such as a volatile memory, a Random-Access Memory (RAM), and/or non-volatile memory, e.g., a Read-Only Memory (ROM) or a flash RAM. The memory is an example of a computer readable medium.

The computer readable medium includes non-volatile and volatile media as well as movable and non-movable media, and may implement information storage by means of any method or technology. The information may be a computer readable instruction, a data structure, and a module of a program or other data. An example of the storage medium of a computer includes, but is not limited to, a phase change memory (PRAM), a static random access memory (SRAM), a dynamic random access memory (DRAM), other types of RAMs, a ROM, an electrically erasable programmable read-only memory (EEPROM), a flash memory or other memory technologies, a compact disk read-only memory (CD-ROM), a digital versatile disc (DVD) or other optical storages, a cassette tape, a magnetic tape/magnetic disk storage or other magnetic storage devices, or any other non-transmission medium, and may be used to store information accessible to the computing device. According to the definition in this text, the computer readable medium does not include transitory media, such as a modulated data signal and a carrier.

Last but not least, the above example embodiments are merely provided for describing the technical solutions of the present invention, but not intended to limit the present invention. It should be understood by those of ordinary skill in the art that although the present invention has been described in detail with reference to the foregoing example embodiments, modifications may still be made to the technical solutions described in the foregoing example embodiments, or equivalent substitution may be made to some technical features in the technical solutions, as long as such modifications or replacements do not cause the essence of corresponding technical solutions to depart from the spirit and scope of the technical solutions of the example embodiments in the present invention.

The present disclosure may further be understood with clauses as follows.

Clause 1. A data processing method, comprising:
acquiring a to-be-processed access request;
generating a communication traffic feature and a content structure feature of the to-be-processed access request according to information carried in the to-be-processed access request;
performing type identification on the to-be-processed access request according to the communication traffic feature and the content structure feature; and
performing anomaly identification on the to-be-processed access request by using a machine learning model when the to-be-processed access request is identified as a first-type access request.

Clause 2. The method of clause 1, wherein the generating a communication traffic feature and a content structure feature of the to-be-processed access request according to information carried in the to-be-processed access request comprises:
extracting a device ID, an access path, an access file ID, and a keyword from the information carried in the to-be-processed access request to form a baseline feature corresponding to the to-be-processed access request as the communication traffic feature; and
generating, according to a keyword in the information carried in the to-be-processed access request and a matching result between the information carried in the to-be-processed access request and each regular expression in an abnormal communication rule, a signature corresponding to the to-be-processed access request as the content structure feature.

Clause 3. The method of clause 2, wherein the performing type identification on the to-be-processed access request according to the communication traffic feature and the content structure feature comprises:
matching the baseline feature and the signature of the to-be-processed access request with a normal traffic baseline library and an abnormal traffic signature library respectively; and
when the baseline feature of the to-be-processed access request does not match a normal traffic baseline and the signature of the to-be-processed access request matches an abnormal traffic signature, determining that the to-be-processed access request is the first-type access request.

Clause 4. The method of clause 3, wherein the matching the baseline feature and the signature of the to-be-processed access request with a normal traffic baseline library and an abnormal traffic signature library respectively comprises:
matching the baseline feature of the to-be-processed access request with the normal traffic baseline library;
when the baseline feature of the to-be-processed access request does not match a normal traffic baseline, matching the signature of the to-be-processed access request with the abnormal traffic signature library; and
when the signature of the to-be-processed access request matches an abnormal traffic signature, determining that the to-be-processed access request is the first-type access request.

Clause 5. The method of clause 3, wherein the method further comprises:
when the baseline feature of the to-be-processed access request does not match a normal traffic baseline and the signature of the to-be-processed access request does not match an abnormal traffic signature, determining an access address corresponding to the to-be-processed access request, counting the number of accesses to the access address within a preset time, and when the number of accesses is less than a set threshold, determining that the to-be-processed access request is the first-type access request.

Clause 6. The method of clause 5, wherein the method further comprises:
when the baseline feature of the to-be-processed access request matches a normal traffic baseline, or when the number of accesses is greater than or equal to the set threshold, determining that the to-be-processed access request is a second-type access request.

Clause 7. The method of clause 3, wherein before the matching the baseline feature and the signature of the to-be-processed access request with a normal traffic baseline library and an abnormal traffic signature library respectively, the method further comprises:
acquiring at least one historical access request;
identifying a first-type historical access request and a second-type historical access request from the at least one historical access request according to the abnormal communication rule; and
generating an abnormal traffic signature library according to information carried in the first-type historical access request, and generating a normal traffic baseline library according to information carried in the second-type historical access request.

Clause 8. The method of clause 7, wherein the identifying a first-type historical access request and a second-type historical access request from the at least one historical access request according to the abnormal communication rule comprises:
matching information carried in each historical access request and information carried in a response message corresponding to each historical access request with a plurality of regular expressions comprised in the abnormal communication rule respectively; and
taking a historical access request with information carried therein and information carried in the corresponding response message both matching at least one regular expression as the first-type historical access request, and taking the remaining historical access requests other than first-type historical access requests as second-type historical access requests.

Clause 9. The method of clause 7, wherein the generating an abnormal traffic signature library according to feature data of the first-type historical access request comprises:

for each historical access request in the first-type historical access requests, generating an abnormal traffic signature corresponding to the historical access request according to a keyword in the information carried in the historical access request and a matching result between information carried in the historical access request and each regular expression comprised in the abnormal communication rule, wherein abnormal traffic signatures corresponding to various historical access requests in the first-type historical access requests form the abnormal traffic signature library.

Clause 10. The method of clause 7, wherein the generating a normal traffic baseline library according to feature data of the second-type historical access request comprises:

for each historical access request in the second-type historical access requests, extracting a device ID, an access path, an access file ID, and a keyword from information carried in the historical access request to form a normal traffic baseline corresponding to the historical access request, wherein normal traffic baselines corresponding to various historical access requests in the second-type historical access requests form the normal traffic baseline library.

Clause 11. The method of any of clauses 1 to 10, wherein the method further comprises:

when the to-be-processed access request is identified as a second-type access request, allowing the to-be-processed access request to directly access a corresponding data responding device.

Clause 12. The method of any of clauses 1 to 10, wherein the method further comprises:

when the machine learning model identifies that the to-be-processed access request is an abnormal access request, forbidding the to-be-processed access request from being sent to a corresponding data responding device; or when the machine learning model identifies that the to-be-processed access request is an abnormal access request, adding a device ID corresponding to the to-be-processed access request to an abnormal device library for a corresponding data responding device to reject subsequent access requests from the device ID.

Clause 13. A data processing device, comprising a memory and a processor, wherein the memory is configured to store a computer program; and the processor is configured to execute the computer program to:

acquire a to-be-processed access request;

generate a communication traffic feature and a content structure feature of the to-be-processed access request according to information carried in the to-be-processed access request;

perform type identification on the to-be-processed access request according to the communication traffic feature and the content structure feature; and perform anomaly identification on the to-be-processed access request by using a machine learning model when the to-be-processed access request is identified as a first-type access request.

Clause 14. The device of clause 13, wherein the processor is specifically configured to:

extract a device ID, an access path, an access file ID, and a keyword from the information carried in the to-be-processed access request to form a baseline feature corresponding to the to-be-processed access request as the communication traffic feature; and generate, according to a keyword in the information carried in the to-be-processed access request and a matching result between the information carried in the to-be-processed access request and each regular expression in an abnormal communication rule, a signature corresponding to the to-be-processed access request as the content structure feature.

Clause 15. The device of clause 14, wherein the processor is specifically configured to:

match the baseline feature and the signature of the to-be-processed access request with a normal traffic baseline library and an abnormal traffic signature library respectively; and when the baseline feature of the to-be-processed access request does not match a normal traffic baseline and the signature of the to-be-processed access request matches an abnormal traffic signature, determine the to-be-processed access request as the first-type access request.

Clause 16. The device of clause 15, wherein the processor is further configured to: when the baseline feature of the to-be-processed access request does not match a normal traffic baseline and the signature of the to-be-processed access request does not match an abnormal traffic signature, determine an access address corresponding to the to-be-processed access request, count the number of accesses to the access address within a preset time, and when the number of accesses is less than a set threshold, determine the to-be-processed access request as the first-type access request.

Clause 17. A computer readable storage medium storing a computer program, wherein when executed by one or more processors, the computer program causes the one or more processors to perform the steps in the method of any of clauses 1 to 12.

What is claimed is:

1. A method comprising:

acquiring a to-be-processed access request;

determining whether a baseline feature corresponding to the to-be-processed access request matches a normal traffic baseline library and whether a signature corresponding to the to-be-processed access request matches an abnormal traffic signature library;

in response to determining that the baseline feature does not match the normal traffic baseline library and the signature does not match the abnormal traffic signature library, determining an access address corresponding to the to-be-processed access request:

counting a number of accesses to the access address within a preset time, and in response to determining that the number of accesses counted is less than a set threshold, determining that the to-be-processed access request is a suspicious access request; and performing an anomaly identification on the suspicious access request.

2. The method of claim 1, wherein the performing the anomaly identification on the suspicious access request includes performing the anomaly identification on the suspicious access request by using a machine learning model.

3. The method of claim 1, wherein:

the baseline feature corresponding to the to-be-processed access request is generated as a communication traffic feature of the to-be-processed access request by extracting one or more features from information carried in the to-be-processed access request, and the signature corresponding to the to-be-processed access request as a content structure feature is generated according to a keyword in the information carried in the to-be-processed access request and a matching result between the information carried in the to-be-processed access request and an abnormal communication rule.

4. The method of claim 3, wherein the one or more features include one or more of the following:
a device ID;
an access path;
an access file ID; and
the keyword.

5. The method of claim 3, wherein the matching result between the information carried in the to-be-processed access request and the abnormal communication rule includes a matching result between the information carried in the to-be-processed access request and one or more regular expression in the abnormal communication rule.

6. The method of claim 1, further comprising:
in response to determining that the baseline feature does not match the normal traffic baseline library and the signature matches the abnormal traffic signature library, determining that the to-be-processed access request is the suspicious access request.

7. The method of claim 6, wherein the determining that the baseline feature does not match the normal traffic baseline library and the signature matches the abnormal traffic signature library comprises:
in response to determining that the baseline feature does not match the normal traffic baseline library, matching the signature with the abnormal traffic signature library.

8. The method of claim 1, further comprising:
in response to determining that the baseline feature matches the normal traffic baseline library, determining that the to-be-processed access request is a non-suspicious access request.

9. The method of claim 1, further comprising:
in response to determining that the number of accesses is greater than or equal to the set threshold, determining that the to-be-processed access request is a non-suspicious access request.

10. The method of claim 1, prior to the determining whether the baseline feature matches the normal traffic baseline library and whether the signature matches the abnormal traffic signature library, further comprising:
acquiring at least one historical access request;
identifying a suspicious historical access request and a non-suspicious historical access request from the at least one historical access request according to an abnormal communication rule;
generating the abnormal traffic signature library according to information carried in the suspicious historical access request; and
generating the normal traffic baseline library according to information carried in the non-suspicious historical access request.

11. The method of claim 10, wherein the identifying the suspicious historical access request and the non-suspicious historical access request from the at least one historical access request according to the abnormal communication rule comprises:
matching information carried in each historical access request and information carried in a response message corresponding to each historical access request with a plurality of regular expressions included in the abnormal communication rule respectively;
determining a historical access request with information carried therein and information carried in the corresponding response message matching at least one regular expression as the suspicious historical access request; and
determining a remaining historical access request other than the suspicious historical access request as the non-suspicious historical access request.

12. The method of claim 10, wherein the generating the abnormal traffic signature library according to the information carried in the suspicious historical access request comprises:
generating an abnormal traffic signature corresponding to a respective suspicious historical access request according to a keyword in the information carried in the respective suspicious historical access request and a matching result between information carried in the respective suspicious historical access request and a respective regular expression included in the abnormal communication rule; and
forming the abnormal traffic signature library based on abnormal traffic signatures corresponding to various suspicious historical access requests.

13. The method of claim 10, wherein the generating the normal traffic baseline library according to the information carried in the non-suspicious historical access request comprises:
extracting a device ID, an access path, an access file ID, and a keyword from information carried in a respective non-suspicious historical access request to form a respective normal traffic baseline corresponding to the respective non-suspicious historical access request; and
forming the normal traffic baseline library based on normal traffic baselines corresponding to various non-suspicious historical access requests.

14. The method of claim 1, further comprising:
identifying the to-be-processed access request as a non-suspicious access request; and
allowing the to-be-processed access request to directly access a corresponding data responding device.

15. The method of claim 1, further comprising:
identifying the suspicious access request as an abnormal access request; and
forbidding the suspicious access request from being sent to a corresponding data responding device.

16. The method of claim 1, further comprising:
identifying the suspicious access request as an abnormal access request; and
adding a device ID corresponding to the suspicious access request to an abnormal device library for a corresponding data responding device to reject subsequent access requests from the device ID.

17. A device comprising:
one or more processors; and
one or more memories storing computer readable instructions that, executable by the one or more processors, cause the one or more processors to perform acts comprising:
acquiring a to-be-processed access request;
determining whether a baseline feature corresponding to the to-be-processed access request matches a normal traffic baseline library and whether a signature corresponding to the to-be-processed access request matches an abnormal traffic signature library;

in response to determining that the baseline feature does not match the normal traffic baseline library and the signature does not match the abnormal traffic signature library, determining an access address corresponding to the to-be-processed access request:

counting a number of accesses to the access address within a preset time, and in response to determining that the number of accesses counted is less than a set threshold, determining that the to-be-processed access request is a first-type access request; and performing an anomaly identification on the first-type access request.

18. The device of claim 17, wherein the acts further comprise:

in response to determining that the baseline feature does not match the normal traffic baseline library and the signature matches the abnormal traffic signature library, determining that the to-be-processed access request is the first-type access request.

19. One or more memories storing computer readable instructions that, executable by one or more processors, cause the one or more processors to perform acts comprising:

acquiring a to-be-processed access request;

determining whether a baseline feature corresponding to the to-be-processed access request matches a normal traffic baseline library and whether a signature corresponding to the to-be-processed access request matches an abnormal traffic signature library;

in response to determining that the baseline feature does not match the normal traffic baseline library and the signature does not match the abnormal traffic signature library, determining an access address corresponding to the to-be-processed access request:

counting a number of accesses to the access address within a preset time, and in response to determining that the number of accesses counted is less than a set threshold, determining that the to-be-processed access request is a first-type access request; and performing an anomaly identification on the first-type access request by using a machine learning model.

20. The one or more memories of claim 19, wherein the acts further comprise:

in response to determining that the baseline feature does not match the normal traffic baseline library and the signature matches the abnormal traffic signature library, determining that the to-be-processed access request is the first-type access request.

\* \* \* \* \*